Dec. 23, 1969   E. T. SAYLOR, JR   3,485,174
APPARATUS FOR TRANSFERRING ENERGY FROM GAS TO A LIQUID
Filed Nov. 9, 1967   4 Sheets-Sheet 1

INVENTOR
EDWARD T. SAYLOR JR.

BY
*Pennie, Edmonds, Morton, Taylor & Adams*
ATTORNEYS

Dec. 23, 1969     E. T. SAYLOR, JR     3,485,174
APPARATUS FOR TRANSFERRING ENERGY FROM GAS TO A LIQUID
Filed Nov. 9, 1967     4 Sheets-Sheet 2
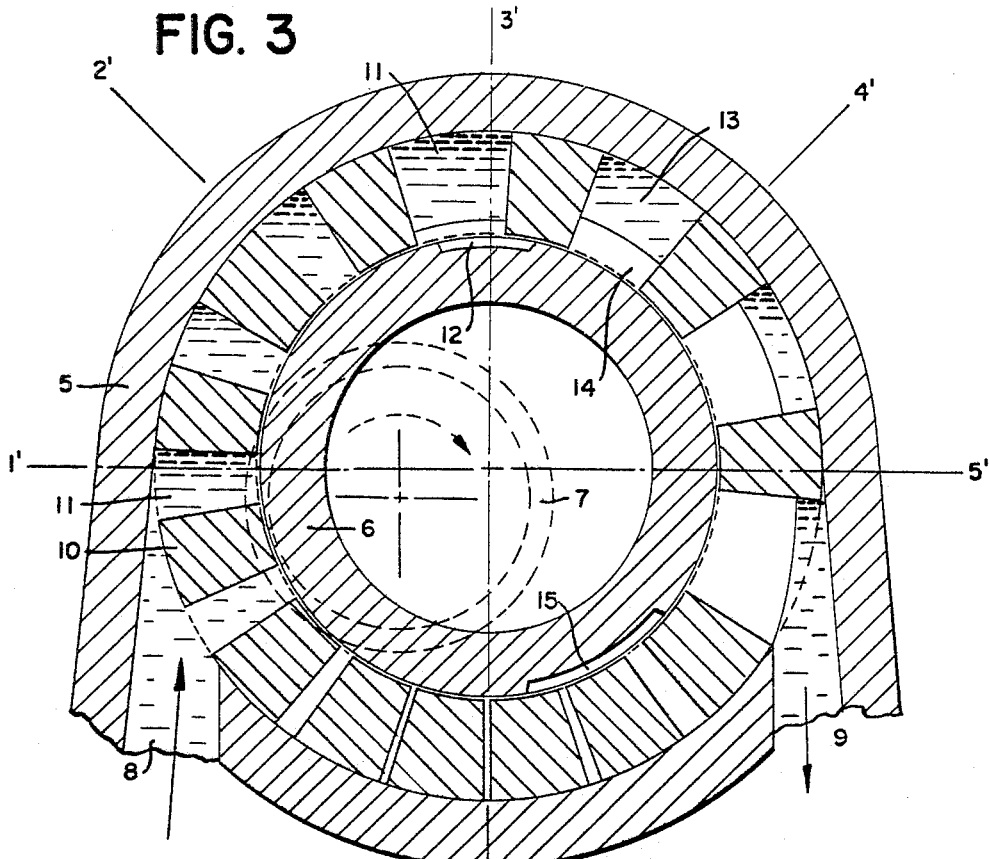
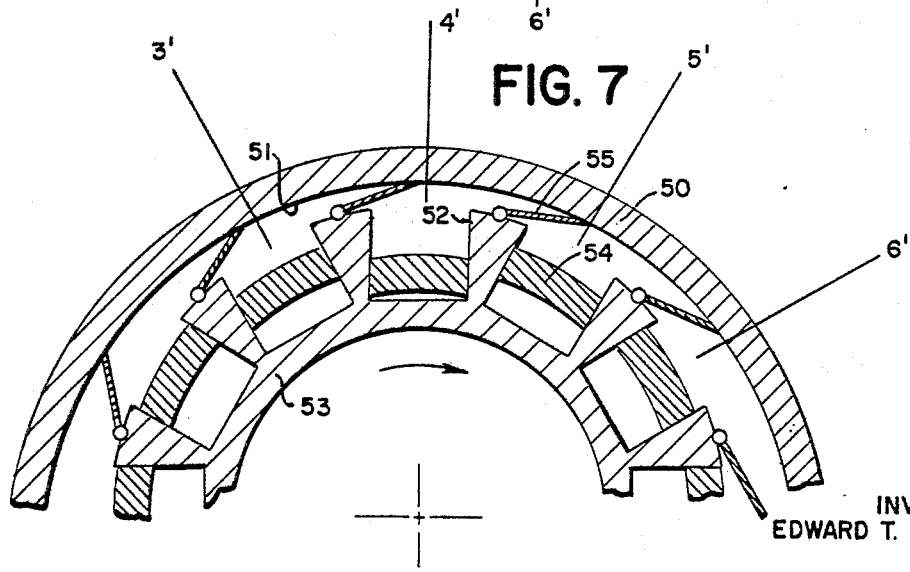
INVENTOR
EDWARD T. SAYLOR JR.
BY
ATTORNEYS

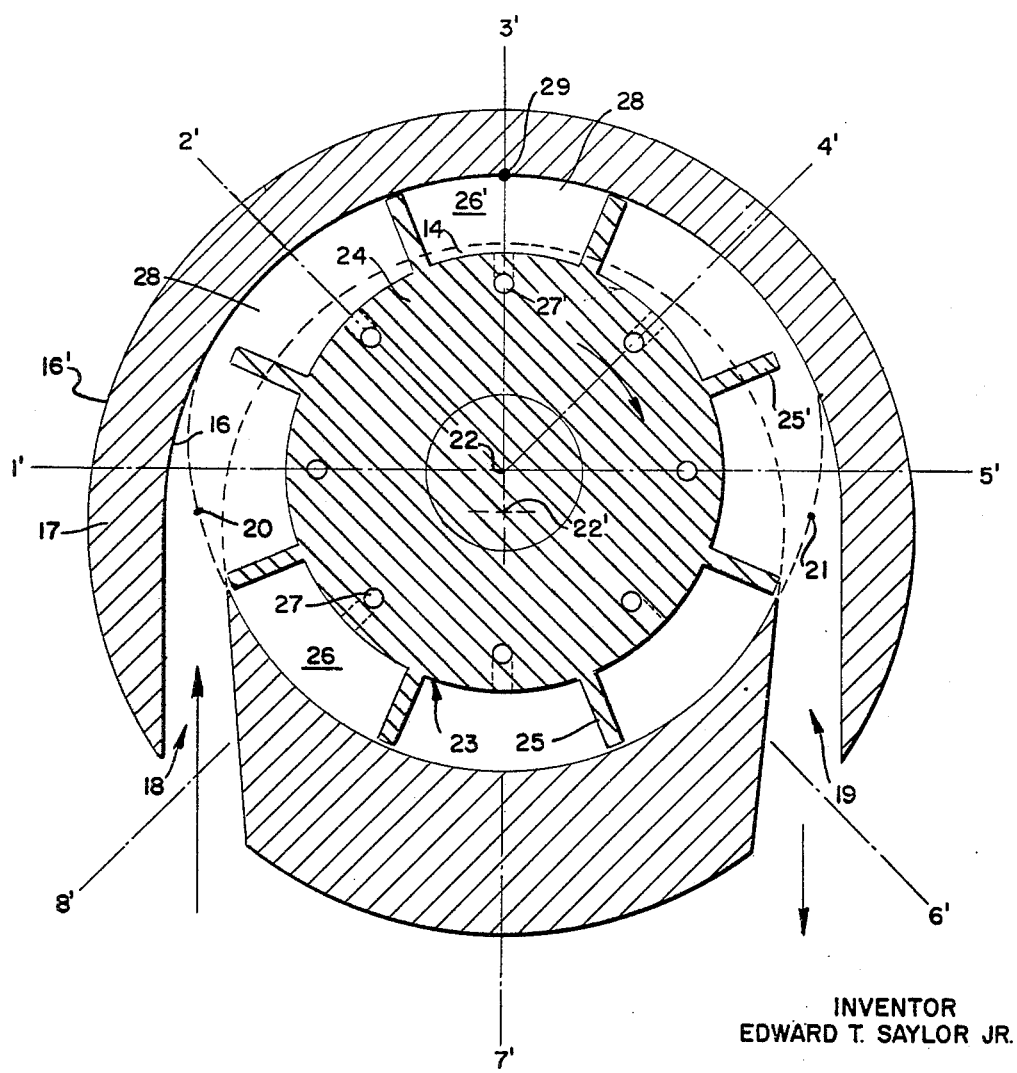

INVENTOR
EDWARD T. SAYOR JR.

United States Patent Office 3,485,174
Patented Dec. 23, 1969

3,485,174
APPARATUS FOR TRANSFERRING ENERGY
FROM A GAS TO A LIQUID
Edward T. Saylor, Jr., 144 E. 22nd St.,
New York, N.Y. 10010
Filed Nov. 9, 1967, Ser. No. 687,947
Int. Cl. F04b 19/06; F04f 1/06; F01c 7/00
U.S. Cl. 103—1                                      9 Claims

ABSTRACT OF THE DISCLOSURE

An apparatus for transferring energy from a gas to a liquid in which the gas and liquid are rotated together in partitioned cells, the volume of the cells being increased to allow the gas to expand as it rotates to produce work against the liquid and further expanding the gas to produce work against the liquid as the liquid is thereafter allowed to escape from the cells, whereby the kinetic energy of said liquid is increased by an amount equal to a decrease in the internal energy of the gas.

BACKGROUND OF THE INVENTION

This invention generally relates to thermodynamic process and apparatus for transferring the internal energy of a gas to a liquid to increase the kinetic energy of the liquid. This invention more particularly relates to a process comprising flowing together a gas and a liquid at the same velocity within partitioned cells, increasing the volume of said partitioned cells to allow the gas to expand as it flows to produce work against said liquid, and further expanding the gas to produce work against the liquid as said liquid is allowed to escape from said cells, whereby the kinetic energy of said liquid is increased by an amount equal to a decrease in internal energy of said gas. This invention further encompasses apparatus for practicing the claimed thermodynamic process, the apparatus including a casing, a circular vaned wheel defining partitioned cells and rotatable within the casing and means for introducing gas and liquid into the cells and exhausting the gas and liquid therefrom.

The present invention provides a novel thermodynamic process and apparatus for practicing the same. Many thermodynamic apparatus are known wherein mechanical work is produced by the expansion of a gas against a solid to convert the internal energy of the gas into mechanical kinetic energy. This fundamental process is practiced in steam and internal combustion engines by the expansion of gas in a cylinder against a piston, and as well in turbine engines by the flow of expanding gas against blades or vanes.

The present invention is distinguishable over these known thermodynamic methods by the fact that the gas working medium and the liquid upon which work is performed are flowed together at the same velocity. As the gas is allowed to expand, it applies pressure to the liquid to thereby perform work thereby increasing the kinetic energy of the liquid by an amount equivalent to a decrease in internal energy of the gas. In its preferred forms, the gas and liquid are rotated together within separate cells partitioned by a piston. A substantial advantage of the apparatus disclosed herein is that close machine tolerances are not required, as is the case in the piston and cylinder configuration of a conventional internal combustion engine. Further, the valving required by apparatus encompassed by the present invention is relatively simple in comparison to most known thermodynamic engines.

The object of the present invention is to provide improved means of pumping liquid in large quantities and high velocities and for providing a novel rotary thermodynamic engine having an improved efficiency. The present invention finds particular application as a means for powering water-jet propelled water craft (such as swamp boats) and submarines. The thermodynamic apparatus of the present invention may utilize steam or any hot gas as a working medium and as well may utilize an explosive gas mixture in an internal combustion engine configuration. As an internal combustion engine, the present invention may efficiently utilize a wide variety of fuels such as hydrogen peroxide, gasoline, diesel fuel, alcohols and injectable powdered solid fuels. As a further area of utility the thermodynamic apparatus of the present invention may be utilized as high speed, high volume water pumps for irrigation.

SUMMARY OF THE INVENTION

The present invention is a thermodynamic process and apparatus for transferring the internal energy of a gas to a liquid to increase the kinetic energy of the liquid. The thermodynamic process claimed herein may be broadly described as flowing together a gas and a liquid at the same velocity while allowing the gas to expand as it flows to produce work against the liquid and further expanding the gas to produce work against the liquid as the liquid is thereafter allowed to escape from the cells, whereby the kinetic energy of the liquid is increased by an amount equal to a decrease in the internal energy of the gas. In the apparatus disclosed herein, this process is practiced by rotating a gas and a liquid together within partitioned cells while increasing the volume of the cells to allow the gas to expand as it rotates to produce work against the liquid to thereby increase the kinetic energy of the liquid.

The thermodynamic apparatus encompassed by this invention includes a casing, a circular vaned wheel defining cells and rotatable within the casing, and means for introducing gas and liquid into the cells and exhausting the gas ans liquid therefrom. The casing of the claimed apparatus has a closed curvilinear configuration inner wall defined by points at non-uniform radial distanues from a center point and further defined by at least one minimum point at a minimum radial distance from said center point located between a liquid supply passage and a liquid discharge passage. Located within the casing is a circular vaned wheel including a central hub and fixed vanes extending radially from the hub at substantially uniform radial distances from the center point, the vanes forming channels to successively communicate with the liquid supply and discharge passages as the wheel rotates. Means are provided within the hub of the vaned wheel for introducing gas into channels of the vaned wheel located approximately opposite the points of the inner wall between said minimum point and said discharge point, the means further adapted to allow the exhaust gas from channels located opposite points other than said points between the minimum point and the discharge point.

In the preferred embodiments of this invention, moveable vanes are incorporated into the fixed vanes which are extendable and retractable therefrom. The moveable vanes being adapted to continuously contact the inner wall to seal the channels. Means are provided to urge the moveable vanes into continuous cointact with selected portions of the inner wall at points between the supply and discharge passages.

Additional preferred embodiments of this invention, provide a piston slideably located within each channel to form a partition between the gas and liquid, the piston being of a material having a density intermediate that of the gas and the liquid. Further preferred embodiments provide means for varying the points on the inner wall between which the moveable vanes contact the inner wall and as well means to control the movement of the pistons located within the channels. Advantageously, portions of the inner wall are moveable to vary the radial distances from the center point to points on said portion of the inner wall, thereby providing means to control the compression ratio of the gas and to control the flow of the liquid intake and discharge.

The apparatus of this invention may be driven by any form of expansible gas. Particular advantage is found in the adaptation of the present invention as an internal combustion engine by the utilization of explosive gaseous mixtures which may be ignited within the channels at appropriate timed intervals.

BRIEF DESCRIPTION OF THE DRAWINGS

FIG. 3 illustrates a first preferred embodiment of this invention in which the principle of this invention is utilized to pump a liquid;

FIG. 4 illustrates a second preferred embodiment of this invention in which the principle of this invention is utilized to pump a liquid;

FIG. 7 is a partial section of a fourth preferred form of this invention.

PREFERRED EMBODIMENTS OF THE INVENTION

Figure 1:
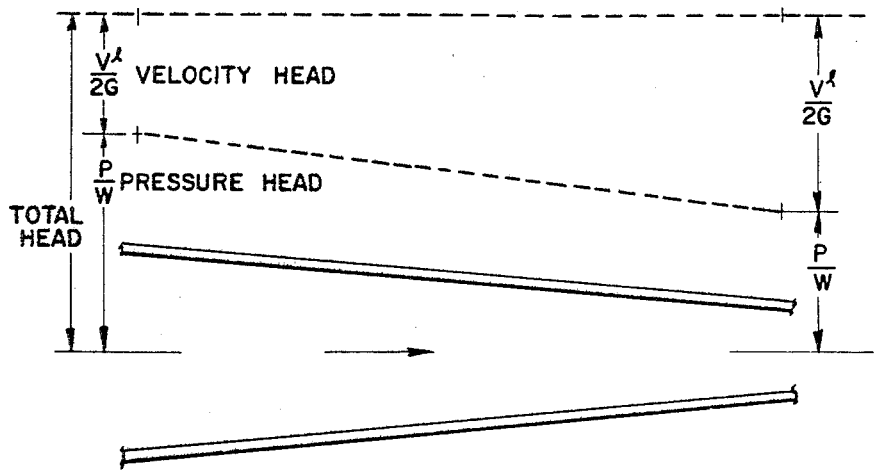
FIG. 1 schematically illustrates the flow of an idealized liquid in a converging conduit superimposed on a graph illustrating changes in velocity and pressure heads.

In the non-resistant flow of incompressible fluids, an increase in kinetic energy is evidenced by increased fluid velocity and is accompanied by an equivalent decrease in pressure head. In FIG. 1 an idealized liquid is represented as flowing from left to right in a converging conduit. As the conduit converges, the fluid velocity and hence the kinetic energy of the liquid will increase. By virtue of the first law of thermodynamics, energy must be conserved and consequently the pressure head of the liquid will decrease by an amount equal to the increase in velocity head, i.e.:

$$\frac{\Delta V^2}{2G} = \frac{\Delta P}{w}$$

Figure 2:
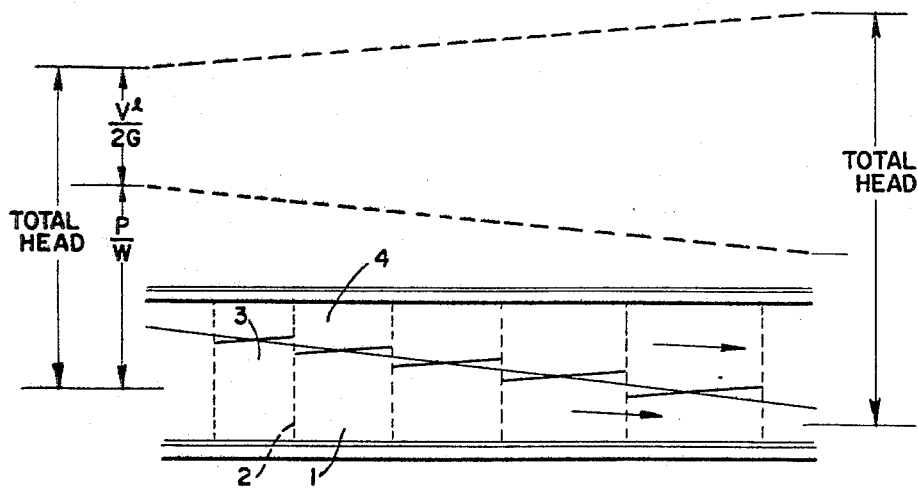
FIG. 2 depicts an idealized gas and an idealized liquid flowing together in a conduit with parallel walls with a graph superimposed illustrating changes in velocity and pressure heads.

In FIG. 2, an ideal gas 4 and an ideal liquid 3 are depicted as flowing together at the same velocity along the length of a frictionless conduit with parallel sides, the gas flow impeded by means so that its velocity is equal to that of the liquid. As the gas 4 and liquid 3 flows together, the gas expands to perform work upon the liquid to thereby increase its velocity or kinetic energy, the decrease in internal energy of the gas being equal to the increase in the kinetic energy of the liquid (assuming no friction losses).

One method by which the flow of gas may be impeded so that its velocity is equal to that of the liquid would be to insert partitions indicated by dashed lines at 2 in FIG. 2 which would partition quantities of gas and liquid into cells 1 as they flow together downstream. As the gas expands, it will exert pressure upon the surface of the liquid and as well upon the partition, thereby forcing the liquid in the partition forward in the direction of flow. As the gas pressure in a downstream cell will be greater than that adjacent upstream cell, the result will be a continuous acceleration or increase in kinetic energy so long as the gas continues to expand.

This principle may be incorporated in an idealized fluid pump depicted in FIG. 3. The idealized pump is comprised of a casing denoted 5 within which is located a rotor 6 which is provided with annular grooves (not shown) in which slide key shaped pistons 10 which form partitions analogous to that shown by dashed lines 2 in FIG. 2. Liquid is introduced into the casing 5 at liquid supply passage 8 where it is entrapped in cells denoted 11 partitioned by key shaped pistons 10. Gear means 7 indicated by dashed lines move a piston located at position 6' from the lower portion of the pump upward into contact to the inner wall of the casing at position 1' to thereby entrap liquid 13 from the liquid supply passage 8. The piston continues to rotate clockwise past position 2' either by means of gear 7 or by means of the pressure of the liquid introduced into supply passage 8 acting upon downstream pistons. As the piston approaches position 3', a gas 14 under pressure is introduced through gas passage 12 into the cell 11 between adjacent pistons. As the gas is allowed to expand as the piston moves from position 3' through position 4' and 5', the liquid on the periphery of the inner wall of the casing is forced forward along with the adjacent upstream piston. At position 5', the piston is released from contact with the inner wall of the housing 5 and the liquid 13 is driven by the pressure of the gas 14 through discharge passage 9. The pistons continue from the discharge passage 9 in a clockwise direction through position 6' where they are again moved forward towards position 1' by gear means 7. It may be understood from the above-described hypothetical pump that the internal energy of the gas 14 is transferred to the liquid in the form of kinetic energy to thereby discharge the liquid from discharge passage 9 at a higher pressure than the liquid 13 introduced at the supply passage 8. Further, the action of the gas 14 upon the liquid 13 and pistons 10 may be transferred to the central hub 2 by suitable gear means (not shown) to power the rotation of the hub and pistons.

A practical means of utilizing the principle of the present invention to pump fluids is depicted in FIG. 4. A rotary pump comprised of a casing 17 is provided with a liquid supply passage 18 and liquid discharge passage 19. Located within the casing 17 is vaned wheel 23 mounted for rotation about a center point 22 which includes a hub 24 and fixed vanes 25 extending radially outward from the center 22 of hub 24. The inner wall 16 of the casing 17 is of a closed curvilinear configuration defined by points at non-uniform radial distances from said center point 22, the inner wall being at a minimum radial distance from the center point 22 at a minimum point 29. Preferably the inner wall is defined by a circle having a center 22' displaced from said center point 22. Gas passages 27 are provided within the central hub 24 as a means for introducing gas into channels 27 formed by vanes 25. Liquid 28 under pressure introduced through supply passage 18 is urged forward by vanes 25 at position 1' and moved forward past position 2' at which point the vanes are spaced sufficiently close to the inner wall 16 to effectively seal portions of liquid 28 within the channels 26. At position 3', gas 14 is introduced under pressure into channel 26' through gas port 27'. As the channel 26' continues to rotate to position 4', the gas is allowed to expand to work upon the gas thereby driving the gas forward past vane 25' towards the discharge passage 19. As the cell reaches position 6' past discharge passage 19, means are provided to allow the gas under pressure to exhaust through the gas ports 27 as the cells 26 continue to rotate towards position 8' near the supply passage 18. As the cells continue past position 8' towards position 1' liquid under pressure from supply passage 18 forces the remaining exhaust gas through ports 27 as liquid 14 fills the cells 26.

Torque is produced causing the vaned wheel 23 to rotate by means of the flow of liquid passed vanes 25' in positions from about 4' through 5'. The above described pump therefore acts both as a rotary motor and a liquid pump whereby portions of the internal energy of the gas 14 introduced through ports 27' are utilized to increase the velocity and pressure of the liquid 28 exiting through discharge passage 19 and to perform mechanical work on the vaned wheel 23.

Figure 5:
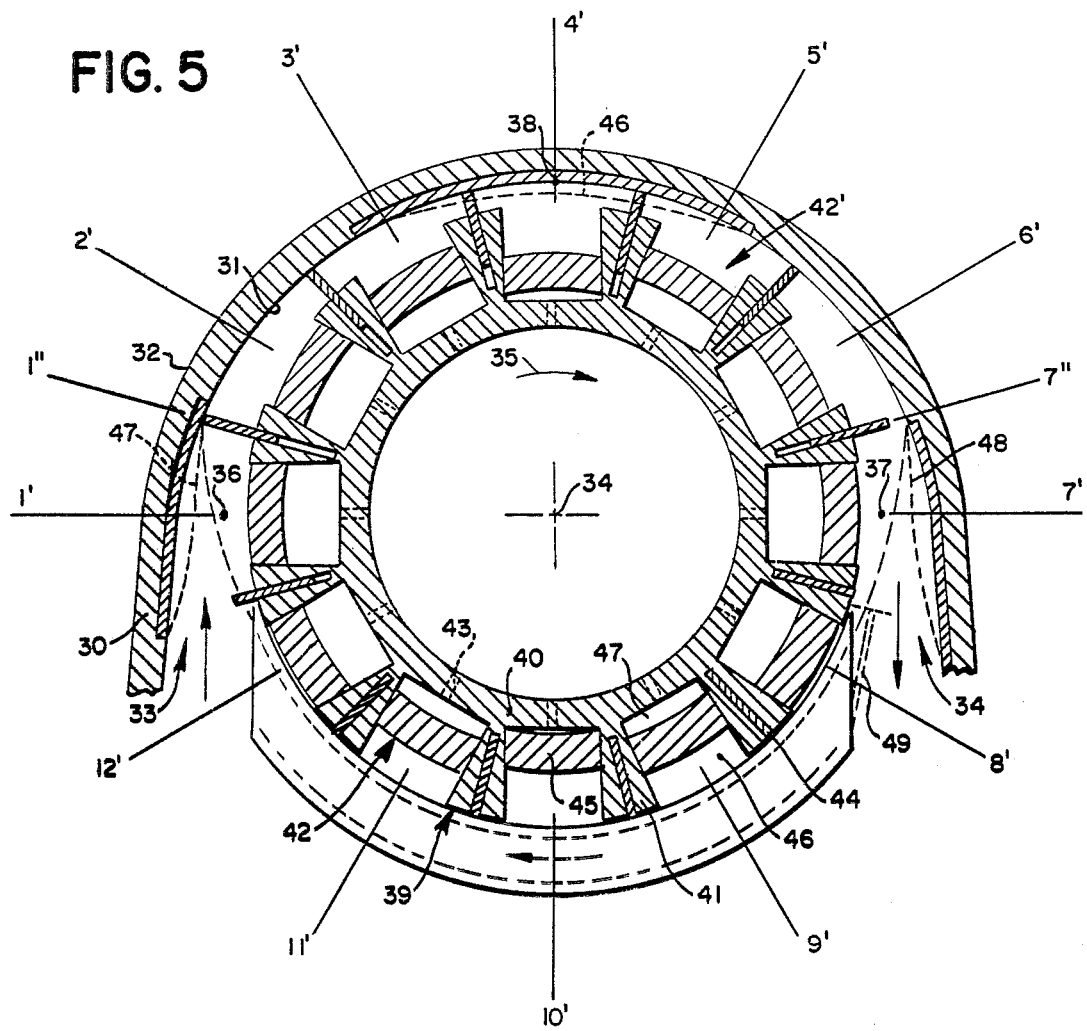
FIG. 5 represents a third preferred embodiment of this invention in which the method of this invention may be utilized either pump liquid or to be utilized in a rotary motor.

FIG. 5 depicts a refinement of the embodiment described above in relation to FIG. 4. This embodiment is adaptable for utilization as a pump or as a rotary motor. This embodiment includes a casing denoted 30 and a rotary vaned wheel 39 arranged within the casing 30 for rotation about center point 34. The casing 30 is provided with a supply passage 33 and a discharge passage 34 located respectively at about positions 12' to 1' and 7' to 8'. The rotary vaned wheel 39 is comprised of a hub portion 40 and fixed vanes 41 which extend radially outward from the hub center point 34. The fixed vanes 41 are provided with moveable vanes 44 which are extendable and retractable from fixed vanes 41 and which are urged by means (not shown) into contact with the inner wall 31 of casing 30. The fixed vanes form channels denoted generally by 42 and which are partitioned by pistons 45 of a material having a density intermediate of that of the liquid and the gas to be utilized. The pistons 45 act to partition channels 42 into gas cells 47 and liquid cells 46.

The inner wall 31 of the casing 30 is of a closed curvilinear configuration defined at points at non-uniform radial distances from center point 34. The radial distance from center point 34 to the inner wall 31 is a maximum at positions 1' and 7' and decreases from either position 1' or 7' to a minimum at positions 4' and 10'. Means (not shown) are provided for engaging moveable vanes 44 into continuous contact with the inner wall 31 at positions from about 1'' to about 7''. As channels 42 rotate from position 1' to position 4' it may be seen that the volume of the channels 42 decrease to a minimum at position 4'. Rotation past position 4' towards position 7' causes an increase in the volumes of channels 42.

Liquid introduced under pressure through passage 33 moves forward in a clockwise direction and becomes sealed in liquid cells 42 by the contacting of a moveable vane 44 with the inner wall at approximately position 1'. As the channels 42 rotate from position 1' towards position 4', the volume of channels 42 decrease thereby forcing the pistons 45 downward to expel gas contained in gas cells 47 through ports 43 located in the central hub 40. At position 4' through 7' gas under pressure is introduced into the gas cells 47 which forces the pistons 45 upward as the channels 42 increase in volume. When the moveable vanes 44 reach a location at approximately that of position 6' means (not shown) disengage the moveable vanes from the inner wall to allow the forward flow of liquid to the discharge passage 34. As the vanes 41 continue past position 7' towards position 8', the moveable vanes 44 become fully retracted within the fixed vanes 41. The inner wall of the casing at positions from 8' through 12' is closely spaced from the fixed vanes to entrap a small portion of the liquid which is thereby transported from position 8' to position 12'. The cells 42 continue their rotation towards position 12' at which point the above described cycle begins again.

Figure 6:
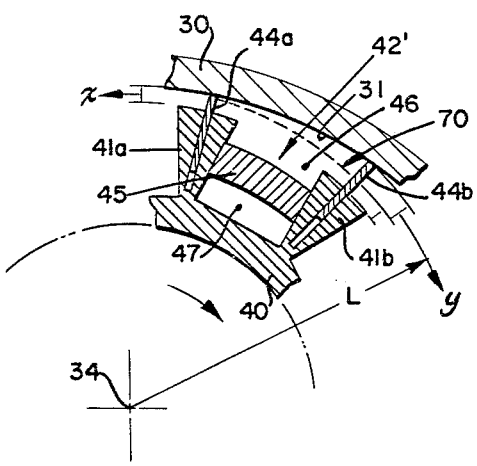
FIG. 6 is a detailed drawing and a section of a portion of the rotor vanes and the casing wall illustrated in FIG. 5.

Torque is produced by the fixed vanes 41 and moveable vanes 44 from positions 4' through 7' due to a pressure differential between adjacent channels 42. As is more clearly illustrated in FIG. 6, with respect to a channel 42' located at approximately positioned 5', gas in cell 47 applies pressure through piston 45 to the liquid contained in liquid cell 46 thereby creating an equal distribution of hydrostatic pressure throughout cell 46. As is shown by dashed line 70, describing a circular arc from moveable vane 44a to 44b, the internal area of liquid cell 46 influenced by a clockwise torque is greater than the internal area influenced by a counterclockwise torque. As illustrated in FIG. 6, the spacing between the end of the fixed vane 41a and the end of the moveable vane 44a is represented by distance $x$; whereas the distances between fixed vane 41b and the end of moveable vane 44b is $x+y$. Therefore, the total moment acting upon channel 42' is equal to distance L times area $y$.

Refering again to FIG. 5, modifications indicated by dashed lines 46, 47, 48 may be made to the depicted preferred embodiment to improve its efficency and to provide a greater flexibility in its performance characteristics. Dashed lines 46, 47, 48 indicate portions of the inner wall which are moveable to vary the radial distances of points at said portions to center point 34. By varying the configuration of portion 47 of the inner wall, the moveable vanes 44 may be caused to contact the inner wall at points closer to position 1'. Further, by varying the configuration of wall portion 47, the flow of liquid into supply passage 33 may be constricted a varying amount to thereby control the quantity of liquid pumped. Wall portion 46 may be varied in configuration to reduce or increase the stroke of piston 45 thereby controlling the compression ratio of the gas contained in gas cells 47. The moveable wall portion 48 may be altered into various venturi configurations to control the discharge pressure and velocity of the liquid at discharge passage 34.

A further modification may be made through the provision of valve 49 (shown by dashed lines) by which the quantity of liquid recycled past positions 8' through 12' may be controlled. Increasing the amount of liquid recycled — thereby decreasing the quantity of liquid pumped — increases the amount of energy applied in the form of torque to rotate vaned wheel 39. If one were to seal off the supply and discharge passages 33 and 38 so that no liquid is pumped but rather a quantity of liquid is allowed to circulate, the apparatus would act as a rotary engine wherein the internal energy of the gas is converted to mechanical rotation of the vaned wheel 39.

A further modification of the described preferred embodiments is depicted by the modification shown in FIG. 7 in which the moveable vanes 44 of FIG. 5 are replaced by flapper vanes 55. Flapper vanes 19 operate in the same manner as moveable vanes 44 to seal off liquid channels 54 at the proper positions in the pumping or engine cycle. At positions shown in FIG. 5 moveable flapper vanes 55 disengage from the inner wall 51 by rotating downwardly as at position 6' to allow the discharge of liquid from channel 54. The advantage of the flapper configuration of flapper vanes 55 is that they will rotate rapidly away from the inner wall 51 under the force of the liquid flowing from liquid channel 54 and thereby reduce frictional losses as the liquid is discharged. The moveable vane 44 depicted in FIG. 5 by necessity would not retract as rapidly and consequentially the flow of liquid past a partially retracted vane would result in consequential resistance loss.

The above description and in particular the preferred embodiments described above are set forth for the purpose of illustration. It should be apparent to those skilled in the art that many modifications and variations may be made upon the present invention without departing from its spirit and scope as is more particularly defined in the appended claims.

I claim:

1. An apparatus for transferring energy from a gas to a liquid comprising:

(a) a casing (17) having an inner and outer wall (16, 16') and provided with suitable liquid supply and discharged passages (18, 19) located respectively at a supply point (20) and a discharge point (21) on said inner wall, said inner wall (16) of a closed curvilinear configuration defined by points at non-uniform radial distances from a center point (22), said inner wall a minimum radial distance from said center point at a minimum point (29) located on an arc of the inner wall (16) between said supply and discharge points (20, 21).

(b) a circular vaned wheel (23) arranged within said casing (17) for rotation about said center point (22) and spaced from said inner wall (16), said wheel including a central hub (24) and fixed vanes (25) extending radially from said hub at substantially uniform radial distances from said center point (22), said vanes (25) forming channels (26) adapted to successively communicate with said liquid supply and discharge passages (18, 19) as the wheel (23) rotates, and (c) means (27) within said central hub (24) for introducing gas into channels (26) of said vaned wheel (23) located approximately opposite the points (3', 4', 5') on the inner wall (16) between said minimum point (22) and said discharge point (21), said means (27) further adapted to allow the exhaust of gas from said channels (26) located opposite points (6', 7', 8') on the inner wall other than said points between the minimum point (23) and the discharge point (21).

2. An apparatus for transferring energy from a gas to a liquid described in claim 1 in which said inner wall (16) is defined by a circle having a center (22') displaced from said center point (22).

3. An apparatus for transferring energy from a gas to a liquid comprising:

(a) a casing (30) having an inner and outer wall (31, 32) and provided with suitable liquid supply and discharge passages (33, 34) located respectively a a supply point (36) and a discharge point (37) on said inner wall (31), said wall (31) of a closed curvilinear configuration defined by points at nonuniform distances from a center point (34), said points located at angular displacements defined with respect to said center point (34) and measured from a reference point (36, 1') in a direction of rotation (35), said supply point (36, 1') at an angular displacement of about 0° and said discharge point (37) at an angular displacement of no greater than about 360°, said inner wall (31) at a minimum radial distance from said center point at a minimum point (38) located at an angular displacement intermediate that of the supply and discharge points (36, 37).

(b) a circular vaned wheel (39) arranged within said casing (30) for rotation about said center point (34) in said direction of rotation (35) and spaced from said inner wall (31), said wheel including a central hub (40) and fixed vanes (41) extending radially from said hub at substantially uniform radial distances from said center point (34), said fixed vanes (41) forming channels (42) to successively communicate with said liquid supply and discharge passages (33, 34) as the wheel rotates in said direction of rotation (35), said fixed vanes (41) and channels (42) located at angular displacements defined with respect to said center point (34) and measured from said reference point (36, 1') in said direction of rotation (35).

(c) means (43) within said central hub (40) for introducing gas into channels (42) of said vaned wheel (39) located at angular displacements (4', 5', 6', 7') between that of said minimum point (38) and that of said discharge point (37), said means (43) further adapted to allow the exhaust of gas from said channels (42) located at angular displacements less than said minimum point (1', 2', 3') and at angular displacements greater than said discharge point (8', 9', 10', 11', 12').

4. An apparatus for transferring the energy from a gas to a liquid as defined in claim 2 in which:

(a) moveable vanes (44) are incomporated in said fixed vanes (41) and are extendable and retractable therefrom, said moveable vanes (44) adapted to extend to continuously contact said inner wall (31) to seal said channels (42), and (b) means to urge said movable vanes (44) into continuous contact with the inner wall (31) at points between a first and second point 1", 6"), said first point (1") at a displacement intermediate that of the supply point (1', 36') and minimum point (4', 38), said second point (6") at a displacement intermediate that of the minimum point (4, 38) and the discharge point (7', 37).

5. An apparatus for transferring energy from a gas to a liquid as defined in claim 3 in which means are provided for varying the points (1", 7") between which said moveable vanes (44) contact the inner wall (31).

6. An apparatus for transferring energy from a gas to a liquid as defined in claim 3 in which a piston (45) is slideably located within each channel (42) to partition said channels into liquid cells (46) located adjacent to the inner wall (31) and gas cells (47) located adjacent to the central hub (40), said piston (45) of a material having a density intermediate that of a suitable gas and a suitable liquid for operating said apparatus.

7. An apparatus for transferring energy from a gas to a liquid as defined in claim 5 in which:

(a) said supply point (36) is located at a displacement of about 0° and said discharge point (37) is located at a displacement of about 180°, (b) means are provided to urge said moveable vanes (44) into continuous contact with the inner wall (31) at points between a first point (1") at an angular displacement greater than 0° and less than 90° and a second point (7") at an angular displacement greater than 90° and less than 180°, and (c) means (43) are provided within said vaned wheel hub (39) for introducing gas under pressure into the gas cells (47) of the channels (42) of said vaned wheel (39) located at angular displacements (4', 5', 6') between about 90° and about 180°, said means (43) further adapted to allow the exhaust of said gas from said channels (42) located at angular displacements (1', 2', 3', 8', 9', 10', 11', 12') from about 180° to about 360° and from about 0° to about 90°.

8. An apparatus for transferring energy from a gas to a liquid as defined in claim 6 in which:

(a) a first portion (46) of said inner wall (31) at displacements (3', 4', 5') of about 60° to about 120° is moveable to vary the radial distances from said center point (34) to points on said first portion (46) of the inner wall (31), said first portion of the inner wall moveable to vary the volume of said channels (42) located opposite said first portion to thereby vary the compression ratio of said apparatus, (b) a second portion (47) of said inner wall (31) at displacements (12', 1', 2') of about 330° to about 30° is moveable to vary the radial distance from said center point (34) to points on said second portion (47) of the inner wall (31), said second portion (47) of the inner wall (31) moveable to vary the angular displacement of said first point (1") at which said moveable vanes (44) contact the inner wall (31) to thereby control the quantity of liquid received from the supply pasage (33), and (c) a third portion (48) of said inner wall (31) located at angular displacements (6', 7', 8') of approximately 150° to 210°, said third portion (48) of said inner wall (31) moveable to vary the radial distances from said center point (34) to points on said third portion (38) of said inner wall (31), said third portion (38) moveable to form venturi shapes to control the exist of velocity and pressure of liquid to said discharge passage (34).

9. An apparatus for transferring energy from a gas to a liquid as defined in claim 7 in which valve means (49) are provided to allow a controlled flow of liquid past the discharge point (37) to said supply point (36), along said inner wall (31) at angular displacements (8, 9, 10', 11', 12') from about 180° to about 360°.

References Cited

UNITED STATES PATENTS

| | | | |
|---|---|---|---|
| 561,126 | 6/1896 | Pendleton | 230—108 |
| 1,853,869 | 4/1932 | Marks | 103—249 X |
| 2,940,657 | 6/1960 | Adams | 230—79 |
| 3,194,163 | 7/1965 | Lee | 103—1 |
| 3,374,743 | 3/1968 | Stutely et al. | 103—1 |
| 895,654 | 8/1908 | Meyersburg | 230—108 |

DONLEY J. STOCKING, Primary Examiner

WARDEN J. KRAUSS, Assistant Examiner

U.S. Cl. X.R.

103—249